United States Patent

Reifschneider

[15] 3,679,735
[45] July 25, 1972

[54] CARBAMIC ACID ESTERS

[72] Inventor: Walter Reifschneider, Midland, Mich.

[73] Assignee: The Dow Chemical Company, Midland, Mich.

[22] Filed: Oct. 15, 1970

[21] Appl. No.: 81,145

[52] U.S. Cl. ............................260/479 C, 71/106, 71/111, 260/468 C, 260/471 C, 260/609 F, 424/299, 424/300
[51] Int. Cl. ..........................................C07c 125/06
[58] Field of Search .......................260/479 C, 471 C, 468 C

[56] References Cited

UNITED STATES PATENTS 3,483,244  12/1969  Paltauf et al............................260/454

Primary Examiner—James A. Patten
Attorney—Griswold & Burdick, S. Preston Jones and C. Kenneth Bjork

[57] ABSTRACT

Carbamic acid esters corresponding to the formula

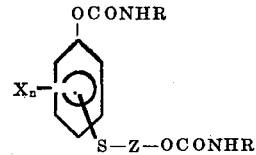

wherein X represents loweralkyl of one to four carbon atoms, loweralkoxy of one to four carbon atoms, chloro, fluoro or bromo; $n$ represents an integer of from 0 to 4; Z represents an alkylene radical of one to four carbon atoms and R represents loweralkyl of one to four carbon atoms, loweralkenyl of two to four carbon atoms or phenyl are prepared. These compounds are useful as pesticides.

9 Claims, No Drawings

CARBAMIC ACID ESTERS

SUMMARY OF THE INVENTION

The present invention is directed to novel carbamic acid esters corresponding to the formula

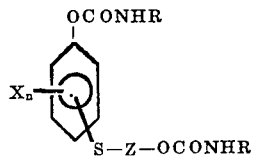

In this and succeeding formulas, X represents loweralkyl of one to four carbon atoms, loweralkoxy of one to four carbon atoms, chloro, fluoro or bromo; $n$ represents an integer of from 0 to 4; Z represents an alkylene radical of one to four carbon atoms and R represents loweralkyl of one to four carbon atoms, loweralkenyl of two to four carbon atoms or phenyl.

Representative loweralkyl moieties include, for example, methyl, ethyl, propyl, isopropyl, cyclopropyl, butyl, secondary butyl, tertiary butyl and cyclobutyl. Representative loweralkoxy moieties include, for example, methoxy, ethoxy, propoxy, isopropoxy, cyclopropoxy, butoxy, secondary butoxy, tertiary butoxy and cyclobutoxy. Representative loweralkenyl moieties include, for example, vinyl, allyl, propenyl, 1-butenyl, 2-butenyl or 3-butenyl. Representative alkylene radicals include, for example, methylene, ethylene, trimethylene, methylethylene, tetramethylene, 1-methyl trimethylene, 2-methyl trimethylene and 1,1-dimethyl ethylene.

The compounds of the present invention are crystalline solids which are of low solubility in water and of moderate to high solubility in many common organic solvents. These compounds are useful as pesticides for the control of insects, fungal and bacterial organisms and terrestrial plants, such as, for example, rice blast, beans, downey mildew, American cockroach, daphnia, housefly, pigweed, Candida albicans, Trichophton mentagrophytes, Pullularia pullulans, Mycobacterium phlei, Candida pelliculosa, Bacillus subtilis and many others.

The new compounds of the present invention are prepared by reacting a (hydroxy alkylthio) phenol corresponding to the formula

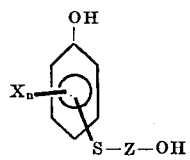

wherein X, $n$ and Z are as hereinabove defined, with an isocyanate corresponding to the formula

RNCO wherein R is as hereinabove defined.

The reaction is conveniently carried out in an inert organic solvent as reaction medium, such as, for example, benzene, methylene chloride, tetrahydrofuran, xylene, toluene, carbon tetrachloride, ether or dioxane. The amounts of the reagents to be employed are not critical, some of the desired compound being obtained when employing any proportion of the reactants. The reaction consumes the reactants in equimolar proportions; however, best yields are obtained when an excess of the isocyanate is employed. The reaction takes place smoothly at temperatures of from 0° to about 100° C. and preferably at about room temperature or a slightly elevated temperature.

In carrying out the reaction, the reactants are contacted together in any convenient fashion and the resulting mixture maintained for a period of time in the reaction temperature range. In a preferred embodiment, the yield of the desired product can be increased and the reaction time decreased by the addition of a catalytic amount of an amine to the reaction mixture as a catalyst. Representative catalysts include, for example, triethylamine, trimethylamine, pyridine, picoline, lutidine and quinoline.

Following the reaction, the reaction mixture is processed by conventional procedures to obtain the desired product. In one such procedure, the reaction medium is distilled to obtain the product as a residue. This residue can, if desired, be further purified by such conventional procedures as washing and/or recrystallization.

Representative carbamic acid esters prepared in accordance with the teachings of this specification include, for example, 4-(hydroxyethylthio)phenol bis-(methylcarbamate); 4-(hydroxyethylthio)phenol bis-(butylcarbamate); 4-(hydroxypropylthio)phenol bis-(methylcarbamate); 4-(hydroxymethylthio)phenol bis-(methylcarbamate); 2-chloro-4-(hydroxyethylthio)phenol bis-(methylcarbamate); 3,5-dimethyl-4-(hydroxyethylthio)-phenol bis-(methylcarbamate); 2,3,5,6-tetramethyl-4-(hydroxymethylthio)phenol bis-(methylcarbamate); 2-methyl-4-(hydroxyethylthio)phenol bis-(methylcarbamate); 2-chloro-4-(3-hydroxypropylthio)phenol bis-(methylcarbamate); 2-fluoro-3-(3-hydroxy-2-methylpropylthio)phenol bis-(phenylcarbamate); 3-bromo-2-(1,1-dimethyl-2-hydroxyethylthio)phenol bis-(allylcarbamate); 2-methyl-4-(3-hydroxypropylthio)phenol bis-(methylcarbamate); 3,5-dimethyl-4-(3-hydroxypropylthio)phenol bis-(methylcarbamate); 2-butoxy-4-(4-hydroxybutylthio)phenol bis-(3-butenylcarbamate); 2,3,5,6-tetramethoxy-4-(4-hydroxybutylthio)phenol bis-(vinylcarbamate); 2,4,6-tribromo-3-(3-hydroxy-2-methylpropylthio)phenol bis-(isopropenylcarbamate); and 2-butyl-4-(4-hydroxybutylthio)phenol bis-(butylcarbamate).

DESCRIPTION OF SOME PREFERRED EMBODIMENTS

The following Examples illustrate the present invention and the manner by which it can be practiced but, as such, should not be construed as limitations upon the overall scope of the same.

Example I: 4-(3-Hydroxypropylthio)phenol bis-(methylcarbamate)

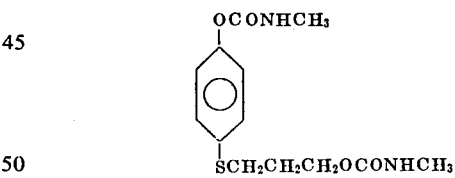

A mixture was prepared containing 10 grams of 4-(3-hydroxypropylthio)phenol, 350 milliliters of methylene chloride, 30 milliliters of methyl isocyanate and 6 drops of triethylamine. This mixture was maintained at room temperature for 7 days. The resulting solution was evaporated to dryness, leaving the 4-(3-hydroxypropylthio)phenol bis-(methylcarbamate) product as a solid residue. This solid product was recrystallized from benzene and obtained in a yield of 92 percent of theoretical. The product melted at 99.5°–101° C. and upon analysis was found to have a carbon, hydrogen and nitrogen content of 52.3, 6.1 and 9.2 percent, respectively, as compared to the theoretical contents of 52.3, 6.1 and 9.4 percent, respectively, calculated for the above-named compound.

Example II: 2-Chloro-4-(hydroxyethylthio)phenol bis-(methylcarbamate)

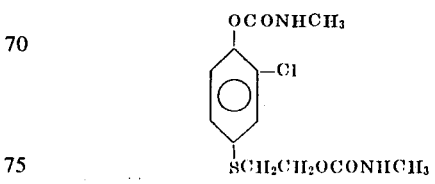

A mixture was prepared containing 15 grams of 2-chloro-4-(hydroxyethylthio)phenol, 350 milliliters of methylene chloride, 40 milliliters of methyl isocyanate and 8 drops of triethylamine. This mixture was maintained at room temperature for 7 days. The resulting solution was evaporated to dryness leaving the 2-chloro-4-(hydroxyethylthio)phenol bis-(methylcarbamate) product as a solid residue. This solid product was recrystallized from benzene and obtained in a yield of 94 percent of theoretical. The product melted at 127.5°–129° C. and upon analysis was found to have a carbon, hydrogen and nitrogen content of 45.5, 4.9 and 8.7 percent, respectively, as compared to the theoretical contents of 45.2, 4.7 and 8.8 percent, respectively, calculated for the above-named compound.

The following compounds of the present invention are prepared in accordance with the methods hereinbefore set forth.

4-(hydroxyethylthio)phenol bis-(methylcarbamate), melting at 124°–125.5° C.;

4-(hydroxyethylthio)phenol bis-(butylcarbamate), having a molecular weight of 368.24;

4-(hydroxymethylthio)phenol bis-(methylcarbamate), having a molecular weight of 272.17;

3,5-dimethyl-4-(hydroxyethylthio)phenol bis-(methylcarbamate), melting at 139°–142° C.;

2,3,5,6-tetramethyl-4-(hydroxymethylthio)phenol bis-(methylcarbamate), having a molecular weight of 326.15;

2-methyl-4-(hydroxyethylthio)phenol bis-(methylcarbamate), melting at 118.5°–120.5° C.;

2-butyl-4-(4-hydroxybutylthio)phenol bis-(butylcarbamate), having a molecular weight of 434.24;

2-fluoro-3-(3-hydroxy-2-methylpropylthio)phenol bis-(phenylcarbamate), having a molecular weight of 454.30;

2-chloro-4-(3-hydroxypropylthio)phenol bis-(methylcarbamate), melting at 122°–123.5° C.;

3-bromo-2-(1,1-dimethyl-2-hydroxyethylthio)phenol bis-(allylcarbamate), having a molecular weight of 443.14;

2-methyl-4-(3-hydroxypropylthio)phenol bis-(methylcarbamate), melting at 105°–107° C.;

3,5-dimethyl-4-(3-hydroxypropylthio)phenol bis-(methylcarbamate), melting at 106.5°–112° C.;

2-butoxy-4-(4-hydroxybutylthio)phenol bis-(3-butenylcarbamate), having a molecular weight of 464.30;

2,3,5,6-tetramethoxy-4-(4-hydroxybutylthiol)-phenol bis-(vinylcarbamate), having a molecular weight of 456.26; and 2,4,6-tribromo-3-(3-hydroxy-2-methylpropylthio)-phenol bis-(isopropenylcarbamate), having a molecular weight of 603.94.

In accordance with the present invention, it has been discovered that the carbamic acid esters can be employed as pesticides in the control of many bacterial, plant, fungal and insect pests. For such uses, the compounds may be employed in an unmodified form or dispersed on a finely divided solid and employed as dusts. Such mixtures can also be dispersed in water with or without the aid of a surface-active agent and the resulting aqueous suspensions employed as sprays. In other procedures, the products can be employed as active constituents in solvent solutions, oil-in-water or water-in-oil emulsions or aqueous dispersions. The augmented compositions are adapted to be formulated as concentrates and subsequently diluted with additional liquid or solid diluents to produce the ultimate treating compositions.

The exact concentration of the toxicant to be employed in the treating compositions is not critical and may vary considerably provided the required dosage of the effective agent is supplied. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight. In such uses, the compound or compositions containing said compounds can be applied to the pests or their habitat.

In a representative operation, substantially complete (at least 85 percent) control of the causative organism of rice blasts was obtained when plants infected with said organism were treated with an aqueous dispersion of one of 2,6-dimethyl-4-(hydroxyethylthio)phenol bis-(methylcarbamate); 2-chloro-4-(hydroxyethylthio)phenol bis-(methylcarbamate); 2-methyl-4-(ydroxyethylthio)phenol bis-(methylcarbamate); 2-methyl-4-(3-hydroxypropylthio)-phenol bis-(methylcarbamate); or 2-chloro-4-(3-hydroxypropylthio)phenol bis-(methylcarbamate), as the sole toxicant, in said aqueous dispersion at a dosage rate of 400 parts per million parts of the ultimate dispersion.

In another operation, 2,6-dimethyl-4-(3-hydroxypropylthio)phenol bis-(methylcarbamate) when employed, as the sole toxicant, in liquid compositions in an amount of 100 parts per million parts of the ultimate composition gives 100 percent control of the common housefly. At a concentration of 500 parts per million parts of the ultimate liquid composition, the compound gives 100 percent control of the American cockroach. At a concentration of one part per million parts of the ultimate liquid composition, 100 percent control of daphnia is obtained.

In other operations, the compounds 2-chloro-4-(hydroxyethylthio)phenol bis-(methylcarbamate) and 2-methyl-4-(hydroxyethylthio)phenol bis-(methylcarbamate) when employed, as the sole toxicant, in aqueous dispersions at a concentration of 400 parts per million parts of the ultimate dispersion give substantially complete (at least 80 percent) kill and control of the causative organism of downey mildew.

In another representative operation, 100 percent kill and control of the organisms Candida albicans, Trichophton mentagrophytes, Bacillus subtilis, Pullularia pullulans, Mycobacterium phlei, Ceratocystis ips, Cephaloascus fragans and Trichoderm sp. Madison was obtained was one of 2-chloro-4-(hydroxyethylthio)phenol bis-(methylcarbamate) or 2-chloro-4-(3-hydroxypropylthio)-phenol bis-(methylcarbamate) was employed, as the sole toxicant, in a nutrient agar at a concentration of 500 parts by weight of compound per million parts of agar.

In other similar operations, each of the compounds 4-(hydroxethylthio)phenol bis-(methylcarbamate); 4-(3-hydroxypropylthio)phenol bis-(methylcarbamate); 2-methyl-4-(3-hydroxypropylthio)phenol bis-(methylcarbamate) and 2-methyl-4-(hydroxyethylthio)phenol bis-(methylcarbamate) gave 100 percent kill and control of the organism Trichophton mentagrophytes when one of the compounds was employed, as the sole toxicant, in a nutrient agar at a concentration of 500 parts by weight of compound per million parts of agar.

In another operation, 2-methyl-4-(3-hydroxypropylthio)phenol bis-(methylcarbamate); 4-(3-hydroxypropylthio)phenol bis-(methylcarbamate) and 4-(hydroxyethylthio)phenol bis-(methylcarbamate) gave 100 percent kill and control of beans, pigweeds and beans, respectively, when applied to the plants, as the sole toxicant, in aqueous dispersions at a rate equal to 10 pounds per acre.

PREPARATION OF STARTING MATERIALS

The substituted and unsubstituted (hydroxyalkylthio)phenols employed as starting materials are prepared by conventional techniques wherein a mercapto phenol of the formula

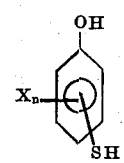

wherein X and n are as hereinbefore defined, is reacted with an alcohol of the formula HO-Z-halogen wherein Z is as hereinbefore defined and the halogen is chloro, bromo or fluoro. The reaction is carried out at a temperature between room temperature and 60° C. and in the presence of a base. Representative bases include, for example, the alkali metal hydroxides, the alkaline earth metal hydroxides and alkylamines, such as, for example, trimethylamine and triethylamine. While the amount of reactants employed is not critical, best results are obtained when the reactants and base are employed in equimolar proportions.

What is claimed is:

1. A compound corresponding to the formula

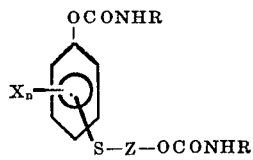

wherein X represents loweralkyl of one to four carbon atoms, loweralkoxy of one to four carbon atoms, chloro, fluoro or bromo; $n$ represents an integer of from 0 to 4; Z represents an alkylene radical of one to four carbon atoms and R represents loweralkyl of one to four carbon atoms, loweralkenyl of two to four carbon atoms or phenyl.

2. The compound as defined in claim 1 which is 4-(hydroxyethylthio)phenol bis-(methylcarbamate).

3. The compound as defined in claim 1 which is 2-chloro-4-(hydroxyethylthio)phenol bis-(methylcarbamate).

4. The compound as defined in claim 1 which is 2-methyl-4-(hydroxyethylthio)phenol bis-(methylcarbamate).

5. The compound as defined in claim 1 which is 3,5-dimethyl-4-(hydroxyethylthio)phenol bis-(methylcarbamate).

6. The compound as defined in claim 1 which is 4-(3-hydroxypropylthio)phenol bis-(methylcarbamate).

7. The compound as defined in claim 1 which is 2-chloro-4-(3-hydroxypropylthio)phenol bis-(methylcarbamate).

8. The compound as defined in claim 1 which is 2-methyl-4-(3-hydroxypropylthio)phenol bis-(methylcarbamate).

9. The compound as defined in claim 1 which is 3,5-dimethyl-4-(3-hydroxypropylthio)phenol bis-(methylcarbamate).

* * * * *